United States Patent [19]

Sarraf

[11] Patent Number: 5,521,748
[45] Date of Patent: May 28, 1996

[54] LIGHT MODULATOR WITH A LASER OR LASER ARRAY FOR EXPOSING IMAGE DATA

[75] Inventor: Sanwal P. Sarraf, Pittsford, N.Y.

[73] Assignee: Eastman Kodak Company, Rochester, N.Y.

[21] Appl. No.: 261,370

[22] Filed: Jun. 16, 1994

[51] Int. Cl.⁶ ........................................ G02F 1/00
[52] U.S. Cl. ................ 359/321; 359/41; 359/254; 359/259; 359/619; 355/40; 347/239
[58] Field of Search .................... 359/245, 254, 359/259, 263, 279–283, 291, 315, 316, 318, 319, 321, 41, 48, 53, 619, 620, 621; 355/40; 347/131, 239

[56] References Cited

U.S. PATENT DOCUMENTS

| | | | |
|---|---|---|---|
| 4,094,606 | 6/1978 | Camphausen | 355/3 |
| 4,343,009 | 8/1982 | Lutz et al. | 359/254 |
| 4,377,753 | 3/1983 | Mir | 359/259 |
| 4,421,387 | 12/1983 | Sprague | 359/279 |
| 4,899,222 | 2/1990 | Price | 358/296 |
| 4,946,233 | 8/1990 | Seto | 359/212 |
| 5,028,939 | 7/1991 | Hornbeck et al. | 347/131 |
| 5,049,901 | 9/1991 | Gelbart | 347/239 |
| 5,072,239 | 12/1991 | Mitcham et al. | 347/255 |
| 5,105,369 | 4/1992 | Nelson | 364/525 |
| 5,132,723 | 7/1992 | Gelbart | 355/40 |
| 5,208,818 | 5/1993 | Gelbart et al. | 372/30 |
| 5,260,719 | 11/1993 | Malooney | 347/135 |
| 5,392,140 | 2/1995 | Ezra et al. | 359/41 |
| 5,414,544 | 5/1995 | Aoyagi et al. | 359/53 |

FOREIGN PATENT DOCUMENTS

| | | |
|---|---|---|
| 385705 | 9/1990 | European Pat. Off. . |
| 0433982 | 12/1990 | European Pat. Off. . |
| 0438924 | 12/1990 | European Pat. Off. . |
| 0433981 | 12/1990 | European Pat. Off. . |
| 0440359 | 1/1991 | European Pat. Off. . |
| 556591 | 8/1993 | European Pat. Off. . |
| 2458424 | 7/1975 | Germany . |
| 2856332 | 7/1979 | Germany . |
| 56-113494 | 9/1981 | Japan . |
| 58-100235 | 6/1983 | Japan . |
| 1665225 | 7/1991 | U.S.S.R. . |
| 91/17483 | 11/1991 | WIPO . |

*Primary Examiner*—Loha Ben
*Attorney, Agent, or Firm*—Nelson Adrian Blish

[57] ABSTRACT

A light modulator for use with a laser or laser diode array such that the light from the laser is imaged on a light modulator having a row of light modulating elements, either of the reflectance or transmittance type. The light modulator is imaged onto a light-sensitive material and the image is scanned line by line on the light-sensitive material. Control circuitry is provided to control the relative movement between the light modulator and the light-sensitive material that may be either in planar form or wrapped out the circumference of cylindrical drum.

16 Claims, 3 Drawing Sheets

LIGHT MODULATOR WITH A LASER OR LASER ARRAY FOR EXPOSING IMAGE DATA

TECHNICAL FIELD OF THE INVENTION

This invention relates to printing systems and, more particularly, to a printing system capable of developing an image and, more particularly, to a printing system including a laser or laser array, illumination optics, a transmittive or reflective type modulator, an imaging lens and a film plane.

BACKGROUND OF THE INVENTION

In a typical laser printer, radiation from laser is shaped, and imaged onto the film plane to produce the desired spot size. The spot forms the smallest element of the image, called "pixel". The laser radiation is modulated in an image-wise fashion to create right image density, pixel by pixel. The laser spot is scanned in line and page directions to create a two-dimensional image. If a continuous wave (CW) type gas or solid state laser is used, an external modulator of Acousto-Optic or Electro-Optic type is favored; for semiconductor diode lasers, laser radiation is modulated by varying the current input to the laser. For printers using high sensitivity media such as silver halide, electrophotoconductor, etc., high throughput is obtained by scanning the laser beam in the line direction by a rotating polygonal mirror, a galvanometer or a hologonal diffractive element, also called "flying spot" printers. For low sensitivity media printer such as a laser thermal printer, higher power lasers are used and exposure requirements of the order of 0.5 joules/cm$^2$ are met by scanning the laser beam slowly in both line and page directions. One way to achieve this is to configure the printer like a "lathe", where line scan is obtained by a rotating drum which holds the film and page scan by translating the laser or drum in the direction along the axis of rotation. For higher throughput, higher power levels are required which cannot be met by a single laser technologically. Many discrete lasers are then ganged together to form multiple spots on the film plane. Multiple pixels are written simultaneously to increase the throughput. An architecture of such a printer using many discrete lasers coupled to optical fibers is suggested in U.S. Pat. No. 4,911,526 and assigned to the same assignee. The cost of discreet lasers and loss of efficiency in coupling to fibers has prompted yet another improvement on this basic concept of multiple lasers, which uses a monolithic array of lasers. The elements of the array are imaged directly on the film to produce multiple spots. Elements of the array are individually modulated to obtain pixel densities. An architecture of such a device is suggested in U.S. Pat. No. 4,804,975 and assigned to the same assignee. The problem with such a device is the complexity of fabricating an array where elements can be individually modulated and the need to modulate high current input to each element at fairly high speeds. The current driver electronics becomes expensive and difficult. High laser power capacity of each element makes it more susceptible for thermal and electrical cross-talks, which create image artifacts. Schemes to eliminate thermal and electrical cross-talks are difficult and expensive. Failure of even one element in the array makes it useless. Planarity and accurate mutual configuration of these elements are essential for use of reasonable optical system and artifact free images.

U.S. Pat. No. 5,132,723 is directed to a method and apparatus for controlling exposure using light valves. The light valve is being imaged onto an object, for example, a sheet of light-sensitive material and the image is scanned along the object either by moving the object or the image. Such an arrangement allows for the correction of exposure and/or compensation for any dead sites. However, such a practice clearly reduces the total throughput of data and requires complicated, individualized calibration techniques to compensate and adjust the exposure for each site in the array.

U.S. Pat. No. 5,049,901 relates to a light modulator that uses large area light sources such as an arc lamp to image onto a two-dimensional light valve, preferably of the deformable mirror type. The light valve is imaged onto a light-sensitive material and the image is scanned along the light-sensitive material. Because the light source is a broad spectrum source, the light valve will absorb energy near the fringes that will result in elevating the operating temperature of the light valve. Because the medium has a limited absorption band energy in that band, it will be used for writing, but a substantial portion of that energy will be absorbed by the light valve. The preferred way of operation requires that a substantial amount of the energy available in a light source should be used for writing purposes and not to raise the temperature of the equipment and surroundings.

U.S. Pat. No. 5,208,818 is directed to a laser system for recording data patterns on a planar substrate. A deformable mirror spatial light modulator is used together with a waveguide-type excimer laser to record a large number of data bits with each laser pulse. This is an ultraviolet (UV) pulsed excimer laser and uses a medium having a thin ablatable coating on a quartz substrate. Multiple exposures by the pulsed laser is used on the modulator to reduce average power density on the modulator. Such a system can find use in the manufacture of circuit boards using photoresist. Contrary to this technique, the present invention uses a constant wave (CW) source for thermal transfer or removal of thermal dyes to record images.

This invention provides solutions which overcome the above-mentioned problems. Laser or laser array is used as the illumination source. A reflective or transmittive modulator is illuminated uniformly by the light from all elements of laser. The elements of the modulator break up the light beam in image elements. Each element of the modulator is subsequently imaged on the film plane to form desired size spots. The modulator can be of a linear or area type with a variety of element densities. Examples of modulators are PLZT, liquid crystal, deflecting, deformable mirrors and elastomers, etc. Modulation characteristics of each modulator element enables image pixel density.

SUMMARY OF THE INVENTION

It is an object of the present invention to provide a solution to the restriction of high power individually addressable diode laser arrays. In this case, the image pixel information comes from the modulator, not the laser. The laser array acts as the uniform high power illumination source. All elements are activated simultaneously with one power supply and provide a CW level power output. This is particularly useful when used for laser thermal printing as it is not possible to obtain such high powers with single elements.

The present invention provides a light modulation and exposure system for exposing image data. This system comprises a laser light source, a light-sensitive material and a linear light modulator having a row of light-modulating elements. The system also has means for illuminating the linear light modulator with the laser light source. The system further includes means for imaging said linear light modulator onto said light-sensitive material and means for generating relative motion between the image of said light modulator and said light-sensitive material with the direction of the motion substantially perpendicular to the direction of said rows of light modulating elements at a rate of one line of image data at a time and means for transferring into the row of modulating light elements the data to be imaged on said light-sensitive material one line at a time.

The present invention further provides an apparatus for modulating light in response to image data from a laser diode array onto light-sensitive material. The apparatus comprises a light modulator having a row of light modulating light elements and a laser diode array positioned to illuminate the light modulator with light-sensitive material positioned to intercept from the light modulator. A lens assembly focuses light from the laser diode array onto the light modulator for directing the light coming from the light modulator onto the light-sensitive material. Them is a control circuitry coupled to the light modulator to control activation of the light elements and means for inputting image data into the row of modulating light elements representing a single line in the image.

BRIEF DESCRIPTION OF THE DRAWINGS

Other features and advantages will become apparent upon reference to the following description of the preferred embodiment when read in light of the attached drawings.

DETAILED DESCRIPTION OF THE PREFERRED EMBODIMENTS

The present invention will now be described in detail with reference to the accompanying drawings. Throughout the drawings, like reference numerals are used to designate like elements for the sake of simplicity of explanation.

Figure 1:
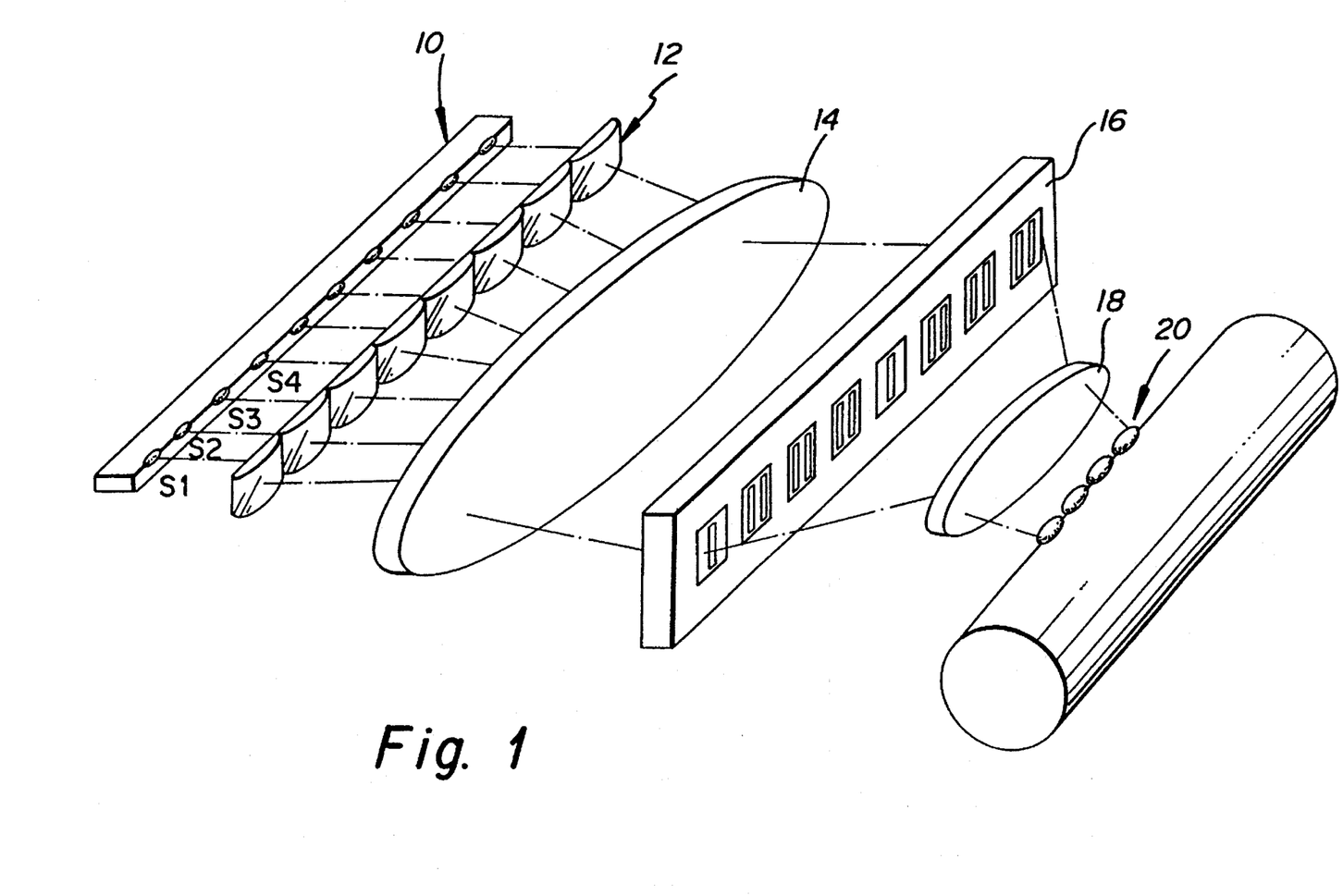
FIG. 1 is a perspective diagrammatic configuration of a preferred embodiment of the inventive recording apparatus, particularly illustrating the component parts thereof used to generate an image.

Referring to FIG. 1, a preferred embodiment of the present invention is shown. A plurality of diode lasers S1, S2, S3, S4 . . . S10 form a laser array shown generally at 10. The elements of the array are activated simultaneously using a common power supply (not shown) in a CW manner. Use of CW laser and non-individually modulated operation of the laser simplifies the power supply and heat dissipation mechanism which can take a variety of forms generally used in these devices.

All elements of the array 10 illuminate a line or area of a specified size on a specified plane. The illumination optics as shown in FIG. 1 can take a variety of forms, from conventional discreet elements to binary optics to a combination thereof to achieve a desired line or area illumination on the modulator. In the particular embodiment illustrated in FIG. 1, an array of lenslets 12 are positioned in front of the laser array 10 where the light from each laser diode S1–S10 in the laser array 10 passes through its corresponding lenslet 12. The lenslet array 12 has power in the array direction and substantially no power in the cross-array direction. A field lens 14 is used to focus the respective light beams on a modulator 16. FIG. 1 shows the use of a transmittive type modulator array 16 with a number of elements configured in modulator array 16. A linear array is shown in FIG. 1 and could be a whole print line or only a few elements of the line, an area or a combination thereof. Elements of the modulator array 16 form individual pixels of the image, the diode array could also take the form of a laser bar. Example of modulators are PLZT, liquid crystal type, electro-optics, acousto-optic type, magneto-optic and any other kind which modulates the light transmitted through it. The size and shape of each element is determined by the characteristics of the modulator, characteristics of the image and desired modulation rate. The light beams after passing through elements of the modulator array 16 are imaged by imaging optics 18 on the film plane 20. The elements are magnified or de-magnified in either direction using anamorphic optics 14 and 18, respectively, depending on the spot size requirement of the light beam at the film plane 20. Both the size and the pitch of the spots can be controlled by appropriately configuring the elements in the modulator array 16 in connection with the choice of imaging optics. The elements in the modulator array are individually modulatable and provide the right image density for each pixel.

Figure 2:
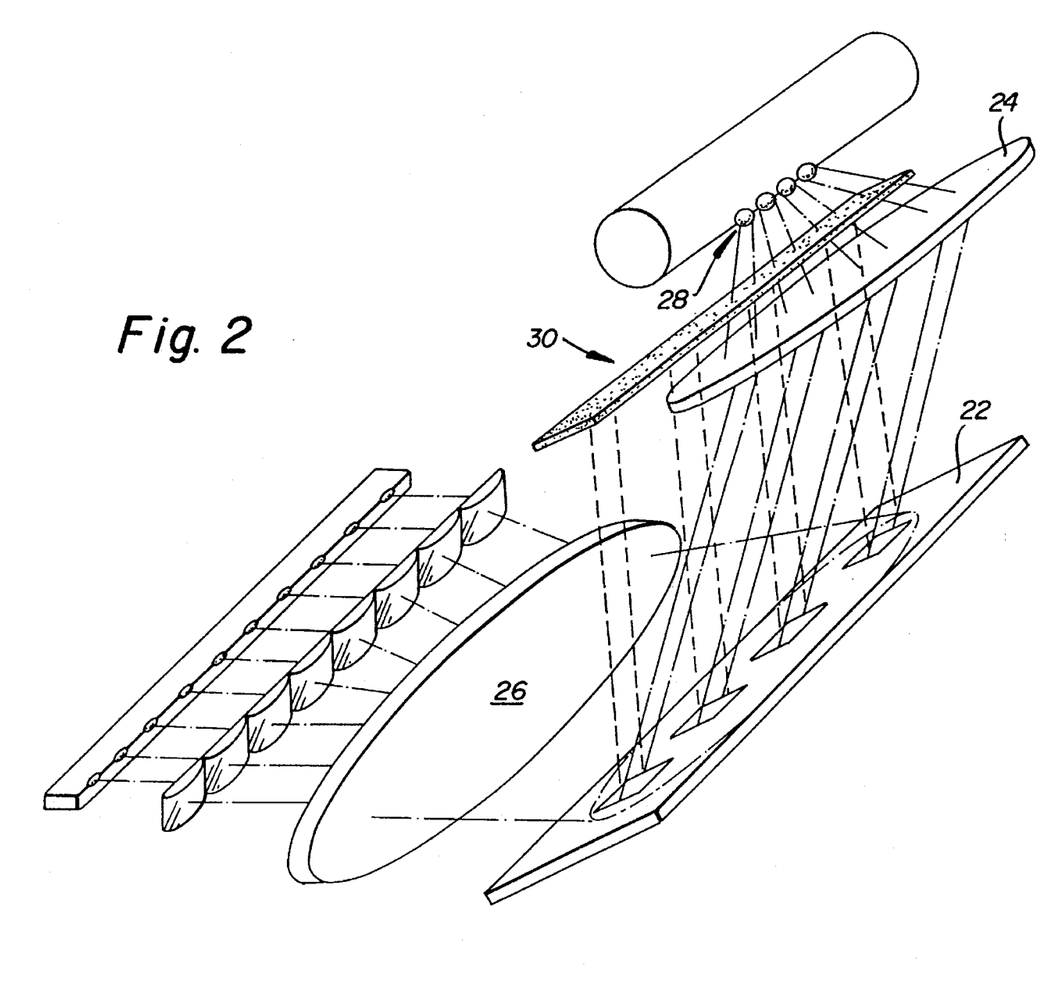
FIG. 2 is a perspective diagrammatic configuration of the component parts of another embodiment of the present invention.

A second embodiment is shown in FIG. 2. In this case, a reflective modulator array 22 is used. The mechanism for generating pixels in an image is similar to the one discussed in the first embodiment except that light is reflected instead of transmitted from each element in the modulator array 22. Examples of such reflective modulators include PLZT, liquid crystals, light valves, A-O, and E-O types. Again, the modulation rate is governed by the characteristics of the modulator array 22. The pixel size and pixel density are dependent upon the array configuration and imaging optics 24.

A special kind of reflective modulator array 22 is based on deformable mirror, deflecting mirror, gratings, elastomers, etc. An example of a deformable mirror is manufactured by Texas Instrument, Inc. In this case, the modulator array 22 takes the form of a series of mirrors or mirror-like devices which are configured in a linear array. The whole modulator array 22 is uniformly illuminated by illumination optics 26 and each mirror in the modulator array 22 which forms a pixel that is imaged on the film plane 28. When a pixel address electrode is energized, each mirror element either deflects or deforms under an electrostatic force that changes the direction of the light being reflected. The reflected light can be captured by a stop 30 and prevented from reaching the film plane 28. The normal state could be the reflection of light to the stop 30 and not having it reach the film plane 28. When a pixel exposure is required, the corresponding mirror element is rotated or deformed for a desired time to expose the film at the film plane 28 and then reverts back to the non-exposure normal state. A gray level of the image can be obtained by tinning the exposure of each pixel. This is the equivalent of pulse width modulation of the diode laser device and the response time depends on characteristics of the device. In some cases, the equivalent of amplitude modulation can be achieved by only partially distorting or rotating the mirror. In this way, only a portion of the light makes it to the film plane 28. The gray level can be achieved by controlling the portion of the light making to the film plane. The same type of operational mechanism applies to a grating, an elastomer and other devices. The high reflectivity is obtained by appropriately coating the mirror surface for the right wavelength.

Depending upon the configuration of modulator elements in the modulator array 22, a whole line or, alternatively, a few pixels of a line can be written using a linear modulator array of elements; or a whole area of the image or a part thereof can be written using an area array of modulator elements.

Other characteristics of the present invention is that the resolution of the image can be zoomed electronically by ganging together of a few elements of the modulator, i.e., supplying them the same pixel data. Effectively a larger pixel size can be achieved this way with the same optical configuration. By shifting modulation operation from the laser to the modulator array, high speed operation can be obtained by easily controlling low levels of voltage and current without any thermal and electrical cross-talk. Also, if any element of laser fails, the overall illumination intensity can be maintained by appropriately increasing the current to another element of the laser.

Figures 3, 4A:
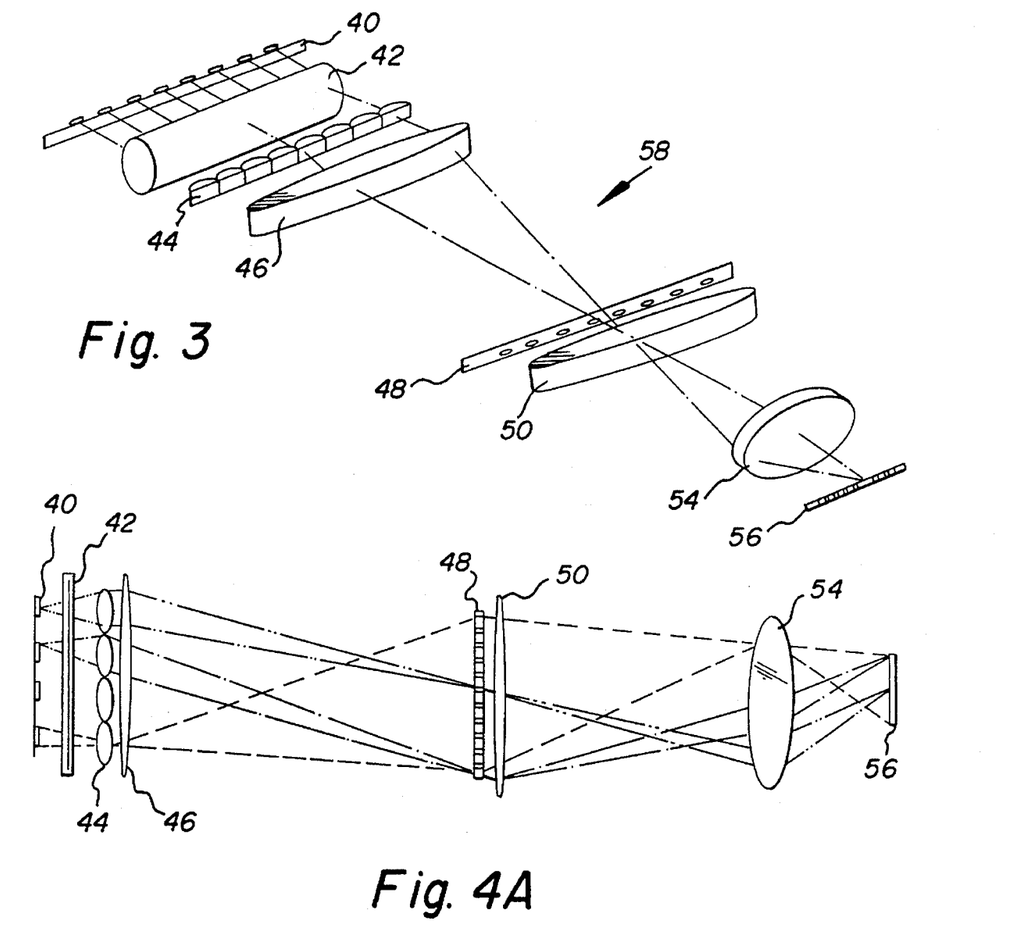
FIG. 3 is a perspective view of a preferred embodiment of the present invention.
FIGS. 4a and 4b are plane views and elevational views of the embodiment illustrated in FIG. 3.

FIG. 3 is a perspective view diagrammatic configuration of a preferred embodiment which also serves as a more detailed example.

Figure 4B:
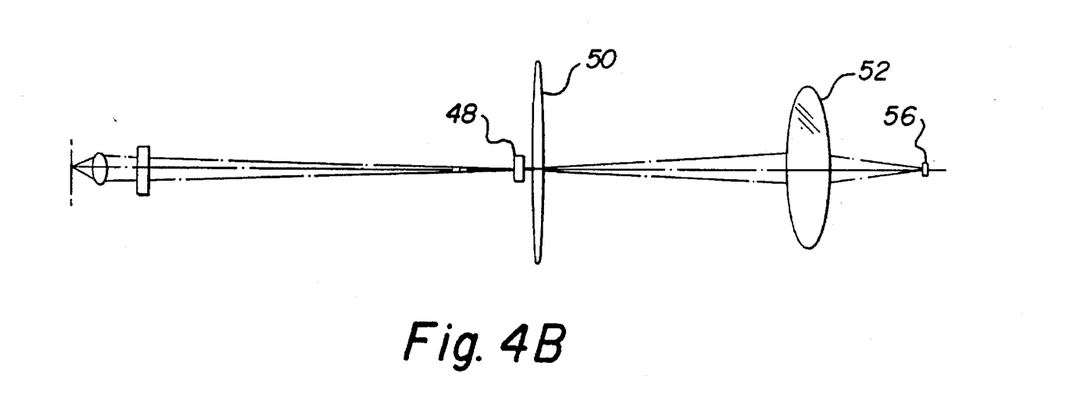

FIGS. 4a and 4b show elevational and plane views of this configuration. The diode laser bar 40 has 12 emitters with spacing dimension of 200 microns in the array direction and 1 micron in the cross-array direction at 800 microns pitch. A rod lens 42 placed about a mm away from the diode array is used to collect light from the cross-array direction of the laser. A cylindrical lenslet array 44 is used to collimate the laser radiation. The lenslet array 44 is placed about 5 mm from the laser array. A field combiner lens 46 is used to combine light from all the emitters of the laser array and illuminate the transmissive modulator 48. The modulator 48 has about 120 channels and is placed about 250 mm from the lenslet array 44. The total size of the modulator 48 is about 10 mm and the size of each element of the modulator is 80 microns by 40 microns with fill factor of about 80%. The field lens 50 in combination with the printing lens 54 provides the image of modulator 48 on the film plane 56 to create writing spots. The de-magnification is about 16 times and the numerical aperture of the spots is about 0.32. The spot size is about 5 microns by 2.5 microns. Each element of the modulator is modulated in the imagewise fashion to generate the desired image.

This invention has been described in detail with particular reference to the preferred embodiment thereof, but it will be understood that variations and modifications can be effected within the spirit and scope of the invention.

I claim:

1. A light modulation and exposure system for exposing image data onto a light-sensitive material, said system comprising:

a plurality of laser light sources, said laser light sources operating simultaneously;

a lenslet array, each lenslet of the array receiving a light beam from an individual laser light source of the plurality of laser light sources;

a field lens which focuses respective light beams from said lenslet array onto a plurality of light-modulating elements, said light-modulating elements being positioned such that the respective light beams illuminate the light-modulating elements, respectively; and means for imaging said light-modulating elements onto said light-sensitive material.

2. A light modulation and exposure system as set forth in claim 1, further comprising:

means for generating relative motion between the image of said light modulator and said light-sensitive material with the direction of said motion substantially perpendicular to the direction of said row of light modulating elements at a rate of one line of image data at a time; and means for transferring into the row of light modulating elements the data to be imaged on said light-sensitive material one line at a time.

3. A light modulation and exposure system as set forth in claim 1 further comprising:

means for generating relative motion between the image of said light modulator and said light-sensitive material with the direction of said motion is perpendicular to the direction of said row of light modulating elements; and means for transferring into the row of modulating light elements the data to be imaged on said light-sensitive material one line at a time.

4. A light modulation and exposure system as set forth in claim 1 wherein a plurality of lenslets are provided to shape each beam of light from the corresponding laser light source.

5. A light modulation and exposure system as set forth in claim 1 wherein the light modulator is a row of electrically controlled deformable mirrors.

6. A light modulation and exposure system as set forth in claim 1 wherein the imaging of the light modulator is done in a manner that only deformable mirrors activated by the image data will result in light reaching said light-sensitive material.

7. A light modulation and exposure system as set forth in claim 1 wherein the light modulator is of the liquid crystal type.

8. A light modulation and exposure system as set forth in claim 1 wherein the light modulator is of the magneto-optic type.

9. A light modulation and exposure system as set forth in claim 1 wherein the light modulator is of the ferro-electric type.

10. A light modulation and exposure system as set forth in claim 1 wherein the light modulator is a two-dimensional light modulator.

11. An apparatus for modulating light in response to image data from a laser diode array onto light-sensitive material, said apparatus comprising:

a) a light modulator having a row of light modulating light elements;

b) a laser diode array positioned to illuminate said light modulator;

c) a first lens assembly for focusing light from said laser diode array onto the light modulator;

d) a second lens assembly for directing the light coming from the light modulator onto the light-sensitive material;

e) control circuitry coupled to said light modulator to control activation of said light modulating elements; and f) means for inputting image data into the row of light modulating elements representing a single line in the image.

12. An apparatus for modulating light in response to image data as set forth in claim 11 wherein said light modulator is a row of electrically controllable deformable mirrors.

13. An apparatus for modulating light in response to image data as set forth in claim 12 wherein said light-sensitive material is wrapped around a cylindrical drum.

14. An apparatus for modulating light in response to image data as set forth in claim 11 wherein said light modulator is of the liquid crystal type.

15. In a light-imaging system which includes a light modulator having a row of light modulating elements, control means for shifting image data one line at a time, a laser light source, light-sensitive material and associated control circuitry for moving the light-sensitive material relative to the light modulator so as to recreate the image from the image data on the light-sensitive material, a method of modulating laser light in response to image data comprising:

a) transferring image data to the row of light modulating elements in said light modulator; and b) directing laser light onto said light modulator such that each light modulating element in said light modulator controls the transmittal of said laser light onto the light-sensitive material when activated by image data.

16. The method according to claim 15 wherein said light modulator is a row of electrically controllable deformable mirrors.

* * * * *

UNITED STATES PATENT AND TRADEMARK OFFICE
CERTIFICATE OF CORRECTION

PATENT NO.   : 5,521,748  
DATED        : May 28, 1996  
INVENTOR(S)  : Sanwal P. Sarraf Page 1 of 3

It is certified that error appears in the above-identified patent and that said Letters Patent is hereby corrected as shown below:

Title page,
Delete title page, showing the illustrative figure and substitute the title page as shown on the attached page.

Figure 1 should be deleted and substitute therefor, Figure 1 as shown on the attached page.

Signed and Sealed this

Eighteenth Day of December, 2001

Attest:

JAMES E. ROGAN  
Attesting Officer    Director of the United States Patent and Trademark Office

United States Patent [19]
Sarraf

[11] Patent Number: 5,521,748
[45] Date of Patent: May 28, 1996

[54] LIGHT MODULATOR WITH A LASER OR LASER ARRAY FOR EXPOSING IMAGE DATA

[75] Inventor: Sanwal P. Sarraf, Pittsford, N.Y.

[73] Assignee: Eastman Kodak Company, Rochester, N.Y.

[21] Appl. No.: 261,370

[22] Filed: Jun. 16, 1994

[51] Int. Cl.[6] ................................................. G02F 1/00
[52] U.S. Cl. ........................ 359/321; 359/41; 359/254; 359/259; 359/619; 355/40; 347/239
[58] Field of Search ........................ 359/245, 254, 359/259, 263, 279–283, 291, 315, 316, 318, 319, 321, 41, 48, 53, 619, 620, 621; 355/40; 347/131, 239

[56] References Cited

U.S. PATENT DOCUMENTS

| | | | |
|---|---|---|---|
| 4,094,606 | 6/1978 | Camphausen | 355/3 |
| 4,343,009 | 8/1982 | Lutz et al. | 359/254 |
| 4,377,753 | 3/1983 | Mir | 359/259 |
| 4,421,387 | 12/1983 | Sprague | 359/279 |
| 4,899,222 | 2/1990 | Price | 358/296 |
| 4,946,233 | 8/1990 | Seto | 359/212 |
| 5,028,939 | 7/1991 | Hornbeck et al. | 347/131 |
| 5,049,901 | 9/1991 | Gelbart | 347/239 |
| 5,072,239 | 12/1991 | Mitcham et al. | 347/255 |
| 5,105,369 | 4/1992 | Nelson | 364/525 |
| 5,132,723 | 7/1992 | Gelbart | 355/40 |
| 5,208,818 | 5/1993 | Gelbart et al. | 372/30 |
| 5,260,719 | 11/1993 | Malooney | 347/135 |
| 5,392,140 | 2/1995 | Ezra et al. | 359/41 |
| 5,414,544 | 5/1995 | Aoyagi et al. | 359/53 |

FOREIGN PATENT DOCUMENTS

| | | |
|---|---|---|
| 385705 | 9/1990 | European Pat. Off. |
| 0433982 | 12/1990 | European Pat. Off. |
| 0438924 | 12/1990 | European Pat. Off. |
| 0433981 | 12/1990 | European Pat. Off. |
| 0440359 | 1/1991 | European Pat. Off. |
| 556591 | 8/1993 | European Pat. Off. |
| 2458424 | 7/1975 | Germany . |
| 2856332 | 7/1979 | Germany . |
| 56-113494 | 9/1981 | Japan . |
| 58-100235 | 6/1983 | Japan . |
| 1665225 | 7/1991 | U.S.S.R. . |
| 91/17483 | 11/1991 | WIPO . |

*Primary Examiner*—Loha Ben
*Attorney, Agent, or Firm*—Nelson Adrian Blish

[57] ABSTRACT

A light modulator for use with a laser or laser diode array such that the light from the laser is imaged on a light modulator having a row of light modulating elements, either of the reflectance or transmittance type. The light modulator is imaged onto a light-sensitive material and the image is scanned line by line on the light-sensitive material. Control circuitry is provided to control the relative movement between the light modulator and the light-sensitive material that may be either in planar form or wrapped out the circumference of cylindrical drum.

16 Claims, 3 Drawing Sheets

Fig. 1